United States Patent
Rosenbaum et al.

(10) Patent No.: US 10,743,459 B2
(45) Date of Patent: Aug. 18, 2020

(54) HAND-HELD SPREADER

(71) Applicant: CHAPIN MANUFACTURING, INC., Batavia, NY (US)

(72) Inventors: Neil J. Rosenbaum, Fayetteville, NY (US); Howard S. Ryan, Skaneateles, NY (US); Fred A. Marconi, Jr., Erieville, NY (US)

(73) Assignee: CHAPIN MANUFACTURING, INC., Batavia, NY (US)

( * ) Notice: Subject to any disclaimer, the term of this patent is extended or adjusted under 35 U.S.C. 154(b) by 322 days.

(21) Appl. No.: 15/410,453

(22) Filed: Jan. 19, 2017

(65) Prior Publication Data

US 2017/0202133 A1    Jul. 20, 2017

Related U.S. Application Data

(60) Provisional application No. 62/280,543, filed on Jan. 19, 2016.

(51) Int. Cl.
*A01C 17/00* (2006.01)
*A01C 7/02* (2006.01)
(Continued)

(52) U.S. Cl.
CPC .............. *A01C 7/02* (2013.01); *A01C 17/001* (2013.01); *B05B 11/00* (2013.01); *B05B 12/002* (2013.01);
(Continued)

(58) Field of Classification Search
CPC ......... A01C 7/02; A01C 15/02; A01C 17/001; B05B 11/00; B05B 12/002;
(Continued)

(56) References Cited

U.S. PATENT DOCUMENTS

| 261,517 A | 7/1882 | Halteman |
| 502,604 A | 8/1893 | Bollinger |

(Continued)

OTHER PUBLICATIONS

Chapin Hand Crank Spreader—1.5L, Model #84150, www.chapinmfg.com, printed Dec. 4, 2015.
(Continued)

*Primary Examiner* — Jason J Boeckmann
(74) *Attorney, Agent, or Firm* — Woods Oviatt Gilman LLP; Katherine H. McGuire, Esq.

(57) ABSTRACT

A hand-held spreader is provided having a housing with a compartment for particulate material, a chamber below the compartment having a bottom wall with a circular aperture, an impeller mounted for rotation in the chamber along such bottom wall responsive to a hand crank, a discharge opening, and a path along which the particulate material passes into the chamber for discharge via the discharge opening. The impeller has an outer circular periphery proximal to and extending over an outer edge of the aperture to form a gap between the impeller and the bottom wall of the chamber that seals the gap from the particulate material larger than the gap from entering under the impeller and risking obstruction of impeller rotation. Any particulate material that enters the gap passes downward through the aperture to enable self-cleaning of particulate material that would otherwise collect under the impeller in the chamber.

14 Claims, 7 Drawing Sheets

(51) Int. Cl.
 B05B 11/00 (2006.01)
 B05B 12/00 (2018.01)
 *E01C 19/20* (2006.01)
 *A01C 15/02* (2006.01)

(52) U.S. Cl.
 CPC ........ *A01C 15/02* (2013.01); *E01C 2019/206* (2013.01)

(58) Field of Classification Search
 CPC .. E01C 2019/206; E01C 19/203; E01C 19/20; B65G 3/04
 USPC ................ 239/152–154, 652, 653, 658, 681
 See application file for complete search history.

(56) References Cited

U.S. PATENT DOCUMENTS

| | | | |
|---|---|---|---|
| 579,049 A | 3/1897 | Eltzroth | |
| 649,953 A | 5/1900 | Rinderknecht | |
| 1,948,668 A | 2/1934 | Kuchler | |
| 2,007,036 A * | 7/1935 | Cornell | G01F 1/42 138/44 |
| 2,243,996 A | 6/1941 | Baughman | |
| 2,514,962 A * | 7/1950 | McElhatton | A01C 15/02 239/683 |
| 2,691,530 A | 10/1954 | Krueger | |
| 3,096,984 A | 7/1963 | Garrison | |
| 3,157,402 A | 11/1964 | Love, Jr. | |
| 3,227,461 A | 1/1966 | Love, Jr. | |
| 3,979,071 A * | 9/1976 | Biggs, Jr. | A01C 15/02 239/653 |
| 3,993,225 A | 11/1976 | Manni | |
| 4,140,280 A | 2/1979 | Allen et al. | |
| 4,609,153 A * | 9/1986 | van der Lely | A01C 17/008 222/482 |
| 5,119,993 A | 6/1992 | Gunzel, Jr. et al. | |
| 5,123,598 A | 6/1992 | Courtney et al. | |
| D327,823 S | 7/1992 | Demarest | |
| D333,951 S | 3/1993 | Courtney et al. | |
| 5,271,568 A | 12/1993 | Stevie | |
| 5,285,971 A * | 2/1994 | Havlovitz | A01C 15/02 222/43 |
| D387,638 S | 12/1997 | Delaby et al. | |
| 6,092,746 A | 7/2000 | Dillon | |
| 6,425,500 B2 | 7/2002 | McNally | |
| D534,044 S | 12/2006 | Zak | |
| D552,946 S | 10/2007 | Shanklin et al. | |
| 7,281,675 B2 | 10/2007 | Elrod et al. | |
| 7,328,861 B2 | 2/2008 | Sagol et al. | |
| 8,191,804 B1 | 6/2012 | Pullara, Jr. | |
| D744,303 S | 12/2015 | Marconi | |
| D796,922 S | 9/2017 | Hsu et al. | |
| 2007/0012730 A1 * | 1/2007 | Pailthorp | A01C 7/02 222/478 |
| 2007/0034710 A1 | 2/2007 | Elrod et al. | |
| 2012/0256021 A1 | 10/2012 | Delorme | |
| 2014/0263484 A1 | 9/2014 | Marconi | |

OTHER PUBLICATIONS

Scotts Turf Builder 5 Lbs. Broadcast Spreader, Item #203124, www.lowes.com, printed Dec. 4, 2015.
Quick Start Guide, Scotts Handy Green II Hand-Held Broadcast Spreader, The Scotts Company LLC, 2011.
Precision HHBS-125 6 Lb Capacity Handheld Broadcast Spreader, walmart.com, printed Dec. 4, 2015.
Plantmates 76500 All-Purpose Spreader, amazon,com, printed Dec. 4, 2015.
Solo 421S 20-Pound Capacity Portable Spreader, amazon.com, printed Dec. 4, 2015.

* cited by examiner

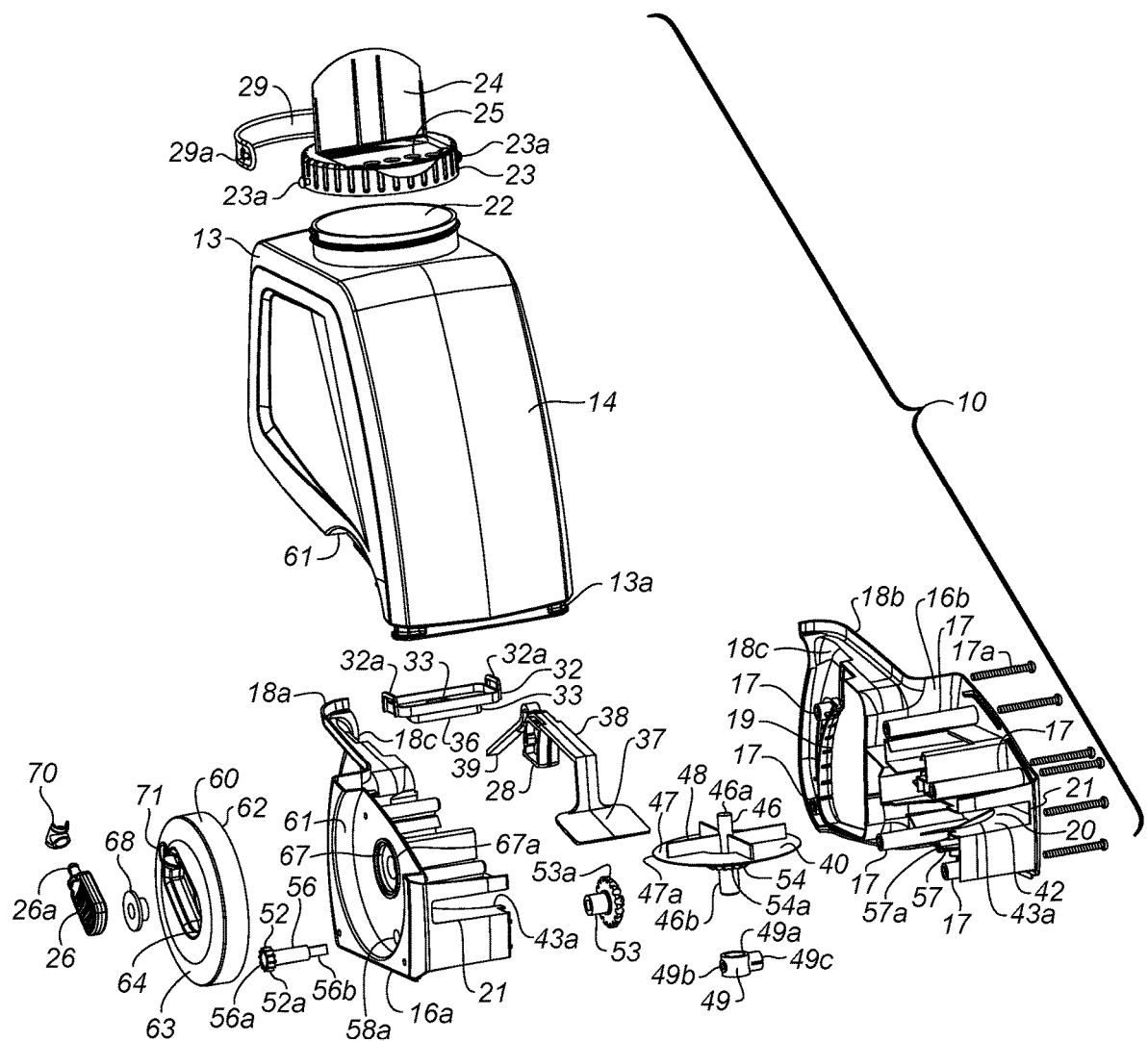
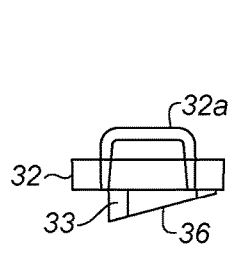 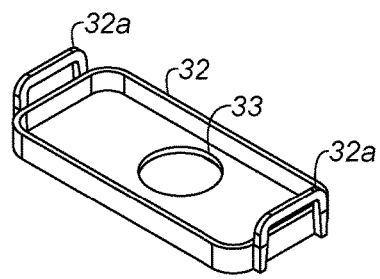 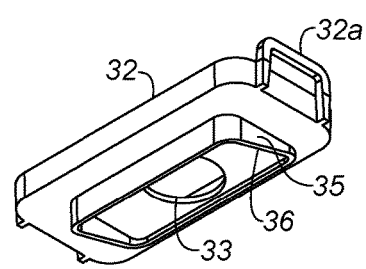
FIG. 5
FIG. 6A          FIG. 6B          FIG. 6C

HAND-HELD SPREADER

Priority is claimed to U.S. Provisional Patent Application Ser. No. 62/280,543, filed Jan. 19, 2016, which is herein incorporated by reference.

FIELD OF THE INVENTION

The present invention relates to a hand-held spreader for distributing particulate material, such as salt, seeds, fertilizer, or the like, and in particular to, a hand-held spreader having a chamber with an impeller which rotates responsive to a hand crank to manually operate the spreader, and a discharge opening along such chamber through which particulate material that falls onto the impeller are discharged from the spreader. The invention is especially useful in providing a hand-operated spreader which prevents particulate material from engaging under the impeller and obstructing impeller rotation, and further is self-cleaning such that any particulate material which passes under the impeller harmlessly exits via an aperture in the bottom of the chamber.

BACKGROUND OF THE INVENTION

Conventional hand-held spreaders typically have a rotating impeller that discharges particulate material falling onto the impeller away from the spreader, thereby distributing such particulate material onto a surface. The impeller is often mounted in a chamber and particulate material is discharged out an opening in one side of the chamber away for the user carrying the spreader. The impeller is rotationally coupled to a hand crank by a rotational drive mechanism which may be provided by gears disposed above the chamber, as shown for example in U.S. Pat. No. 3,157,402 to Love, Jr., U.S. Pat. No. 3,227,461 to Love, Jr., U.S. Pat. No. 3,096,984 to Garrison, and U.S. Pat. No. 5,271,568 to Stevie, or by gears disposed below the impeller, such as shown in U.S. Pat. No. 5,285,971 to Havlovitz.

One problem with conventional hand-held spreaders is that the impeller often jams due to particulate material getting lodged in the chamber under the impeller obstructing impeller rotation. Jamming of the impeller is undesirable as it can damage or dislodge the impeller, and moreover can cause damage to the spreader's rotational drive mechanism if a user continues to turn the hand crank in an attempt to dislodge the jammed particulate material. Another problem with conventional hand-held spreaders is that particulate material collects in the chamber under the impeller, which if not periodically cleaned, can build-up and impact spreader performance.

SUMMARY OF THE INVENTION

Accordingly, it is an object of the present invention to provide an improved hand-held spreader which prevents particulate material in the chamber from engaging under an impeller of the spreader that could otherwise obstruct impeller rotation.

Another object of the present invention is to provide an improved hand-held spreader that is self-cleaning of particulate material from the chamber which may fall under the impeller.

Briefly described, the spreader embodying the present invention comprises a housing having an upper compartment for particulate material and a lower chamber having a bottom wall with a circular aperture, a rotationally mounted impeller located along such bottom wall onto which falls particulate material from the upper compartment, and a discharge opening along the side of the chamber through which particulate material which falls upon the impeller is discharged outward from the spreader. A rotatable hand crank along the outside of the housing is coupled to the impeller to enable rotation thereof. The impeller has a circular platform with a plurality of upright vanes, and an outer circular edge offset with respect to the outer circular edge of the aperture so that an outer periphery or edge of the platform marginally extends radially over the outer circular edge of the aperture to form a gap between the bottom surface of the platform along its outer periphery and the bottom wall of the chamber. This gap is selected of a height that seals the gap from individual or clumps or particulate material larger than the gap from entering under the impeller, and any particulate material that enters the gap passes there through downward under and away from the impeller via the aperture at the bottom of the chamber. Thus, the outer circular periphery of the impeller's platform lies proximal to and extends over the outer circular edge of the aperture about its 360 degree perimeter in order to form this gap.

It has been found that selecting the gap to be as small as possible while avoiding the outer periphery of the impeller's platform from contacting the chamber's bottom wall is advantageous so that the impeller is free to rotate in the chamber of the spreader. For example, the gap may be 0.037 inches, but other gap dimension, such as at or between 0.01 and 0.04 inches may be used, so long as such prevents particulate material from entering the gap between the impeller and the bottom wall of the chamber which would otherwise risk jamming the impeller from rotating. Particulate material that passes through the gap and under the impeller, via the bottom aperture of the compartment, are so small in size that it cannot effect impeller rotation or hinder the gearing mounted under the impeller, and thus can harmlessly exit the spreader via a bottom opening of the housing. Thus, a self-cleaning spreader having a chamber mounted impeller is provided. Particulate material can both exit from a side discharge opening of the chamber and out of a bottom opening of the housing below the chamber's aperture, such as onto a surface, e.g., ground or roadway. Alternatively, the opening along the bottom of the housing has a cover which may be removable to allow a user to remove or clean collected particulate material that may have passed through the aperture of the chamber.

The housing has a lower handle portion enabling a user to hand carry the spreader. A movable trigger along the handle portion is mechanically coupled to a movable gate extendible over an opening at the top of the chamber in a path of particulate material from the upper compartment into the chamber. The trigger is biased forward to normally close the gate over the opening at the top of the chamber, thereby preventing particulate material from falling onto the impeller. Backward motion of the gate by pulling back the trigger against such bias enables flow via the opening at the top of the chamber, which with impeller rotation by turning of the hand crank enables operation of the spreader. The amount or extent the gate uncovers the opening at the top of chamber by pulling backward on the trigger enables a user to meter the particulate material flow to a desired rate into the chamber.

Preferably, a flow rate cap member is provided having an opening in the path of particulate material from the upper compartment into the chamber in which the opening of the flow rate cap member is of a diameter to permit a desired rate of flow of particulate material up to a maximum flow rate along the path when the gate is positioned to allow such maximum flow into the chamber. Such flow rate cap member may represent one of multiple flow rate cap members each with a different diameter opening selected for use in the spreader. The flow rate cap member thus is replaceable with another one of such flow rate cap members as desired to set the flow rate.

The spreader is operated in a mode by discharge of particulate material via the discharge opening when particulate material is provided upon the spreader from the upper compartment and the impeller is rotated. The housing of the spreader has an upper opening through which particulate material may be received for storage in such upper compartment, and a removable cap located over such upper opening to close the upper opening such as during operation of the spreader. Optionally, such cap may have holes which enables the spreader to be operated in another mode by manually shaking particulate material out of the compartment via such holes. The cap may have a hinged cover over such holes which may be lifted to enable such holes to provide an alternative path of particulate material out of the spreader.

BRIEF DESCRIPTION OF THE DRAWINGS

The foregoing and other objects, features and advantages of the invention will become more apparent from a reading of the following description in connection with the accompanying drawings in which:

FIG. 5 is an exploded view of the spreader of FIG. 1;

FIGS. 6A, 6B, and 6C are cross-section, and top and bottom perspective views, respectively, of a flow rate cap member of FIGS. 3 and 5 having an aperture in the path of particulate material from the supply compartment of the spreader;

DETAILED DESCRIPTION OF THE INVENTION

Figure 1:
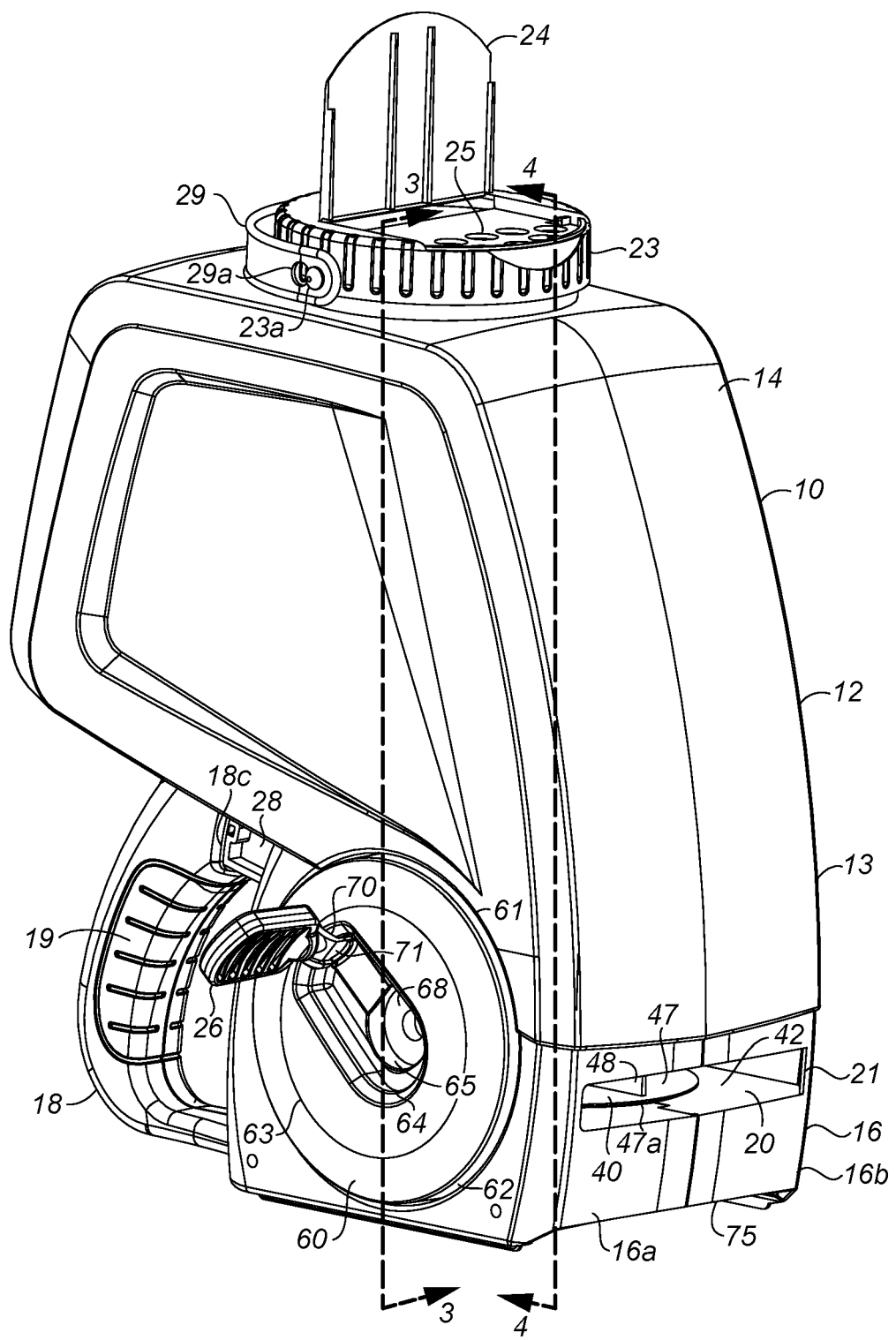
FIG. 1 is a perspective front view of the spreader of the present invention from the left side thereof.

Referring to FIGS. 1-5, a spreader 10 of the present invention is shown having a housing 12 with an upper housing portion 13 providing an upper compartment 14 for storing particulate material, such as salt particulates or seeds, to be spread, a lower housing portion 16, and a handle housing portion 18 enabling a user to hand carry the spreader 10 using a handle or grip 19. The lower housing portion 16 has a chamber 20 having a side discharge opening 21. An impeller 40 is rotationally mounted in chamber 20, as described below, and receives particulate material falling along a path 15, as indicated by a dashed arrow in FIG. 3, from compartment 14 (when a gate 37 moves backwards to at least partially open such path as shown for example in FIG. 7B). The impeller 40 breaks up clumps of particulate material (if any) and projects the particulate material outward through discharge opening 21 from housing 12 along a path 15a, as generally indicated by a dashed arrow in FIG. 3, to distribute the material along a surface or ground as desired by a user. For purposes of illustration, particulate material stored in compartment 14 for passage along path 15 is denoted by numeral 11 in FIG. 3.

Upper portion 13 of the housing has a top cylindrical opening 22 through which particulate material 11 may be received and then stored in compartment 14. Cylindrical opening 22 may be closed by a top cap 23 having internal threads which screws onto threads along the outside of cylindrical opening 22. Optionally, cap 23 may have a hinged cover or lid 24 that normally is closed over multiple holes 25 of cap 23. Such lid 28 may be lifted in case a user wishes to use the spreader 10 to shake particulate material out of compartment 14 via opening 22 and holes 25, instead of turning a hand crank 26 to rotate impeller 40 while pulling a trigger 28 to move gate 37 to enable passage of particulate material along path 15 into chamber 20 and then out of chamber 20 along path 15a, as described in more detail below. Thus, a spreader 10 having cap 23 with optional holes 25 provides another mode of manual operation of spreader 10 to distribute particulate material in addition to the mode of operation utilizing impeller 40 to distribute particulate material. In either mode, a user may hand-hold the spreader by handle 19. For purposes of illustration, lid 24 is shown in its lifted state in FIGS. 1, 2, and 5, rather than a closed state over holes 25. Also, a handle 29 may be present provided by a curved strip with two ends having openings 29a through which extends two opposing projections 23a from cap 23. Such handle 29 is retained by such projections 23a to cap 23, and pivotal about such projections 23a such as for use by a user if desired in carrying the spreader, rather than by using handle 19.

Figure 7A:
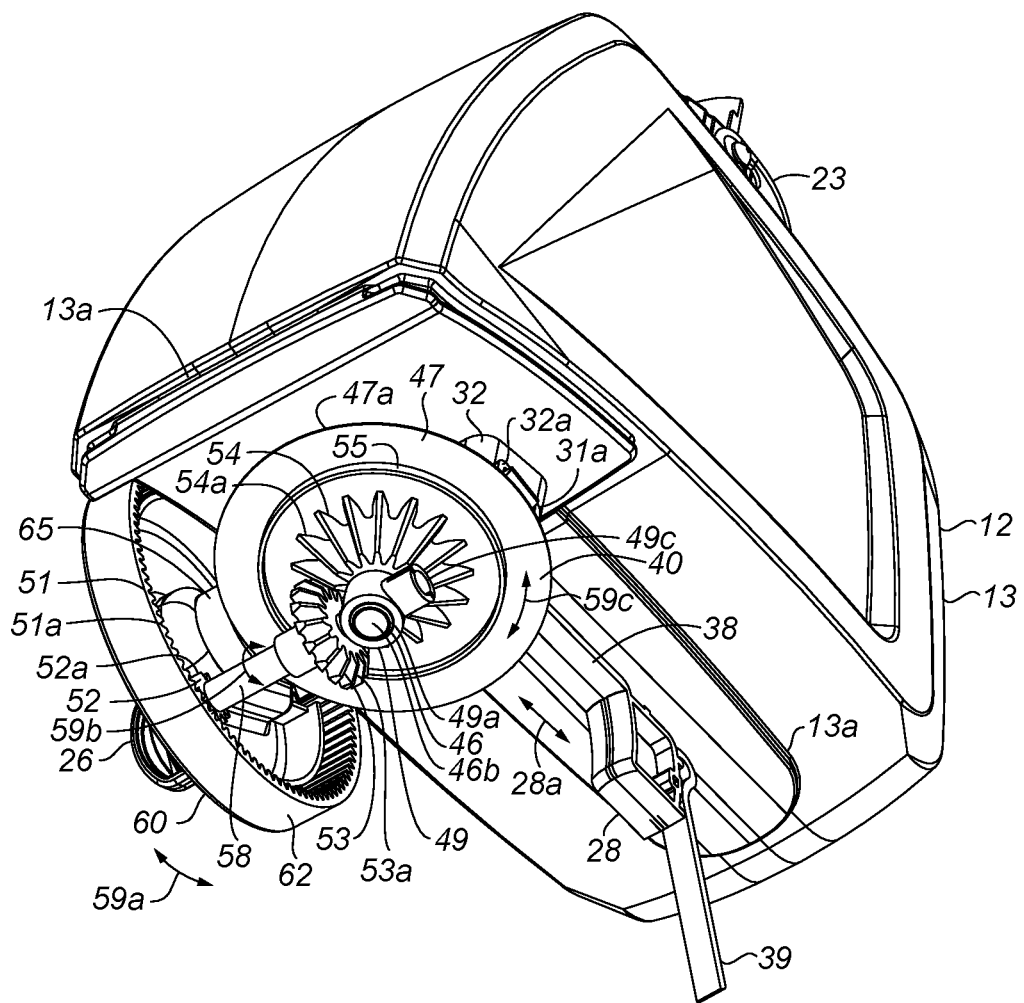
FIG. 7A is a perspective bottom view of the spreader of FIG. 1 in which the lower housing portion has been removed to show the gears of the drive mechanism.
Figure 7B:
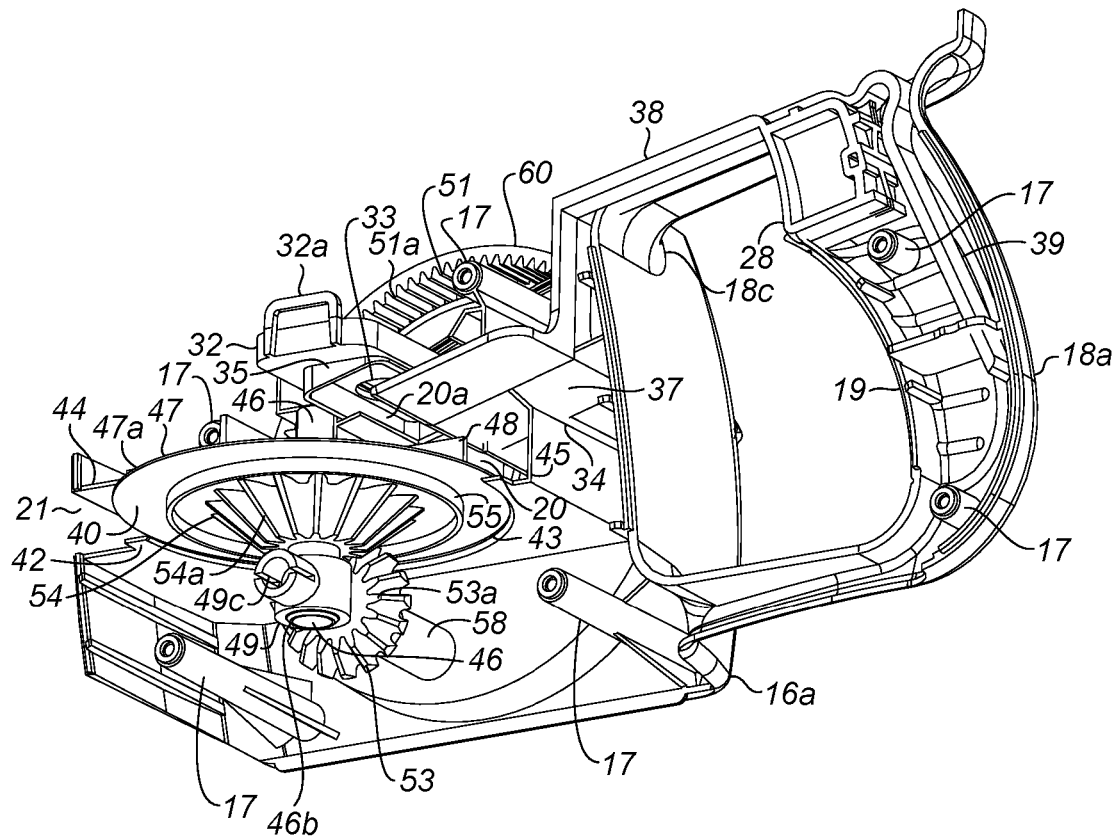
FIGS. 7B and 7C are perspective and elevational views, respectively, of the left side of the lower portion of housing of the spreader of FIG. 1 in which the upper housing portion and right side of the lower portion of the housing are removed, where the gate is shown in an open state in FIG. 7B, and the gate is shown in a closed state in FIG. 7C.
Figure 7C:
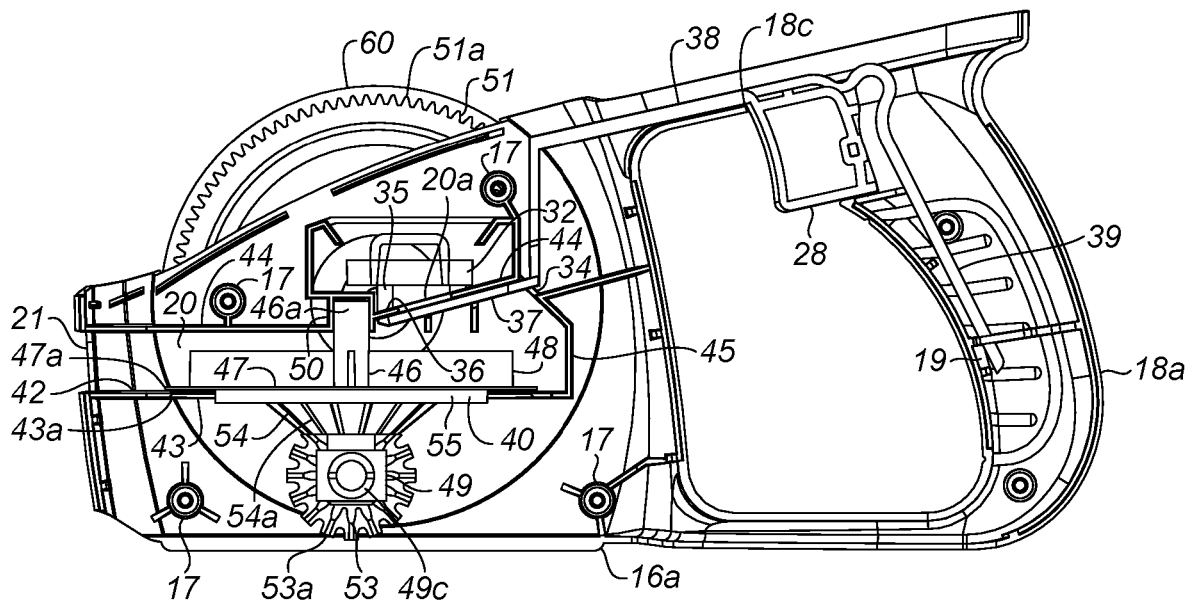

The lower housing portion 16 is an assembly of a left lower housing portion 16a with a left handle portion 18a, and a right housing portion 16b with a right handle portion 18b. The moveable components of the spreader 10 are assembled as shown in FIGS. 7B and 7C onto the left lower housing portion 16a and then aligned with right housing portion 16b. Six screws 17a (FIG. 5) are provided which extend through openings along the outside of right housing portion 16b into threaded tubular members 17 that extend from opposing sidewalls of housing portions 16a and 16b. When assembled together by screws 17a, the upper housing portion 13 has grooves 13a along the bottom edges thereof which capture ridges 16c extending upward from the lower housing portion 16 and handle portion 18, so that the entire spreader assembly is joined together. Other mechanisms for assembling the upper and lower housings 13 and 14 together in housing 12 may also be used.

Figure 3:
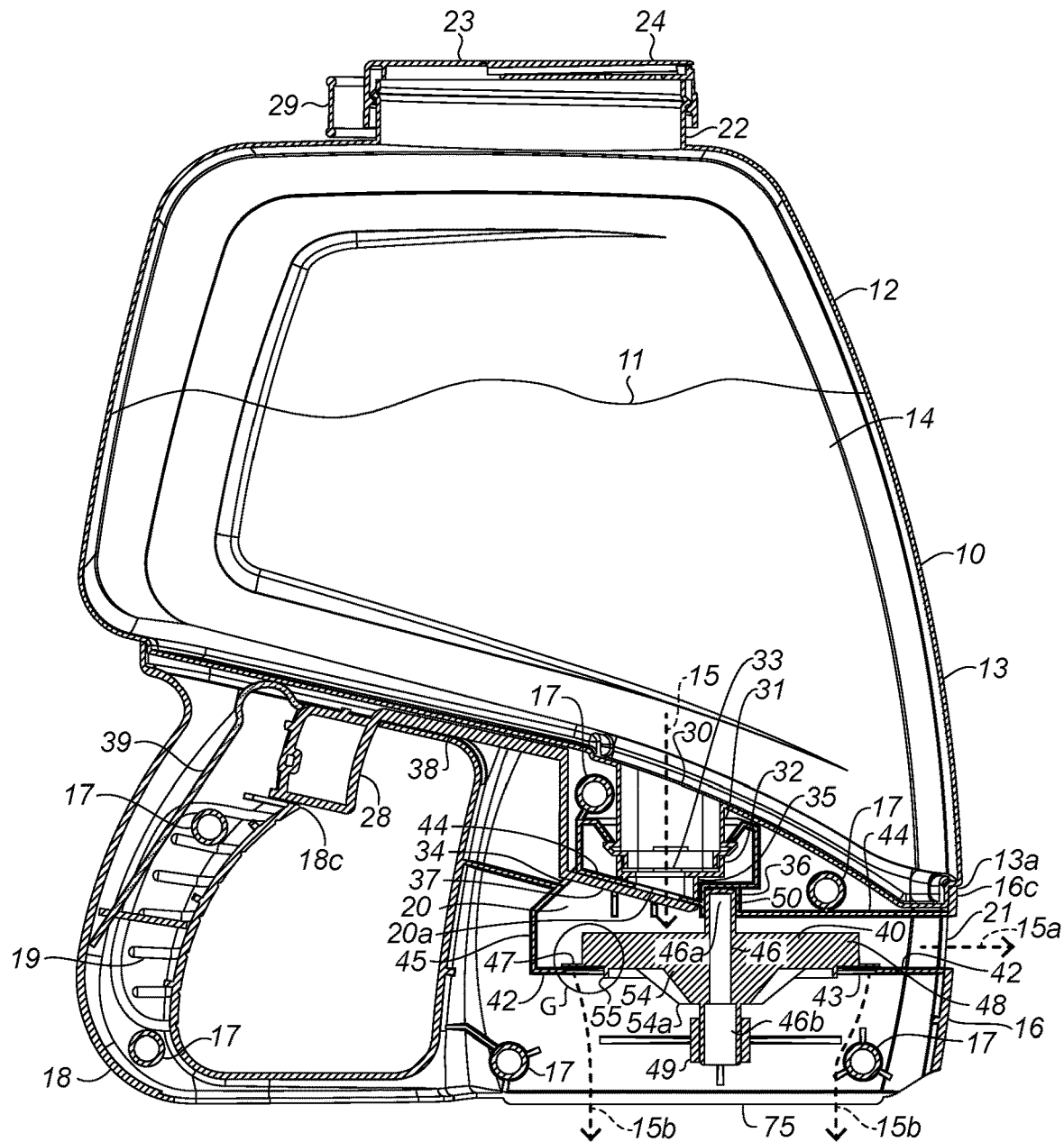
FIG. 3 is a cross-sectional view taken along line 3-3 of FIG. 1 in the direction of arrows at the ends of the line with the lid of a top cap of the spreader closed.

As shown in FIG. 3, particulate material 11 along path 15 falls via an opening 30 at the bottom of compartment 14 into a conduit 31, and then via an aperture (or opening) 33 of a cap 32 disposed over the lower end of conduit 31. Along the bottom surface of the cap 32 extends a continuous wall or shield 35 having a bottom angled edge 36 abutting an angled rear portion along the upper surface of a top wall 44 of chamber 20. Such cap 32 is shown in more detail in FIGS. 6A-C. Under the shielded portion of the top wall 44 of chamber 20 is an opening 20a extending through the top wall 44 for passage of particulate material along path 15 into chamber 20.

A flat gate 37 extends at a downward angle through an upper rear opening 34 of chamber 20 into the chamber along the lower surface of top wall 44, so that gate 37 is movable over opening 20a, as best shown in FIGS. 3 and 7C. Gate 37 is coupled to a trigger 28 via a linkage member 38 that angles upwards from gate 37 and extends within the top of the handle housing portion 18 to trigger 28 disposed in an opening 18c of handle housing portion 18, so that trigger 28 is disposed as an actuator member at the top of handle 19 to control flow of particulate material into chamber 20 along path 15. An extension member 39 extends downwardly within the handle portion 18 and applies a forward bias to the integrated structure of trigger 28, linkage member 38 and gate 37, so that normally gate 37 is disposed in a closed state along wall 44 to close opening 20a and prevents particulate material along path 15 (i.e., through aperture 30, conduit 31, and cap aperture 33) from entering chamber 20, via opening 20a (as shown in FIG. 7C), until trigger 28 is operated by a user.

To operate trigger 28, a user holding the spreader 10 by handle 19 pulls with his or her finger(s) backwards on the trigger 28 to overcome the forward bias of extension member 39. This enables backward motion of the trigger 28 and gate 37 until the front edge of gate 37 no longer fully occluding opening 20a (such as shown in FIG. 7B), thereby allowing particulate material 11 to flow along path 15 from compartment 14, through aperture 30, conduit 31, cap aperture (or opening) 33, and opening 20a, into chamber 20, onto impeller 40. For purposes of illustration, path 15 is shown in FIG. 3 when the gate 37 is in an open state. The amount of backward motion of the trigger 28 meters the flow of the particulate material into chamber 20 depending on the amount or extent gate 37 uncovers opening 20a until a full open state when front edge of gate 37 is positioned behind opening 20a, such as by pulling fully back on trigger 28 to handle portion 18. Lateral motion of trigger 28 to move gate 37 is indicated by arrow 28a in FIG. 7A. Thus, the user can control the flow of particulate material that falls on the impeller 40 and exits via discharge opening 21 in concert with impeller 40 rotation by turning of the hand crank 26, as described below. Releasing trigger 28 moves the gate 37 forward returning gate 37 to its closed state over chamber opening 20a ceasing the flow of particulate material into compartment 20.

To retain cap 32 onto conduit 31, two upward extending C shaped loops 32a along opposite sides of cap 32 are received into two clips 31a along the exterior of the conduit 31 near its bottom (see FIG. 3), so that cap 32 snap fits over the lower open end of conduit 30. The diameter of aperture 33 may be the same or less than the diameter of opening 20a at the top of chamber 20. Different caps 32 with different dimensioned apertures 33 may be provided as desired to accommodate different sized particles of particulate material when present in compartment 14 to be spread by spreader 10. Preferably, a cap 32 is selected for use in spreader 10 having an aperture 33 so that particulate material 11 can flow easily through aperture 33 along path 15 up to a desired maximum flow rate onto a rotating impeller 40 when gate 37 is in a full open state. Thus, cap 32 provides a flow rate cap member (at a desired setting by the diameter of its aperture 33), which may be replaced with another flow rate cap member with a different such diameter aperture 33. For example, cap 32 having aperture 33 of 0.5 inches in diameter may be used for passage of typical ice melting particulate material within spreader 10 along path 15, while another one of cap 32 may be used in spreader 10 with its aperture 33 being ⅞ inches in diameter for passage of rock salt particulate material along path 15.

As best shown in FIG. 7C, chamber 20 has a bottom wall 42 with a circular aperture 43 in which is disposed an impeller 40 for rotation along bottom wall 42. The chamber 20 further has along its top wall 44 with openings 20a and 34 as described above, side walls 45 between bottom wall 42 and top wall 44, and front side discharge opening 21. Impeller 40 has a central shaft 46 which defines the axis of rotation of the impeller, a circular platform 47 centrally disposed about such shaft 46, and vanes 48 which extend upright from the upper surface of platform 47. Upper end 46a of shaft 46 is journaled for rotation in a cylindrical recess forming a hole 50 along top wall 44 of chamber 20, while the bottom end 46b of shaft 46 increases in diameter and is journaled for rotation in a hole 49a through a retainer bushing 49 mounted stationary with respect to housing 12. This aligns the axis of rotation of impeller shaft 46 through the center of circular aperture 43.

A drive mechanism to impeller 40 is provided having gears 51, 52, 53, and 54. As best shown in FIGS. 5 and 7A, pinion gear 52 is fixed at an end 56a of a rotatable shaft 56 which extends through an opening 58a into a cylindrical member (or tube) 58 (FIG. 7B) that inwardly extends from the left side wall of lower housing portion 16 in recess 61. The other end 56b of shaft 56 exits cylindrical member 58 and is fixed in a center hole of a cylindrical extension of gear 53. Gear 53 has beveled teeth 53a which engage (or mesh with) beveled teeth 54a of gear 54 which extends downward from the underside of platform 47 of impeller 40 about shaft 46. The axis of rotation of gears 52 and 53 and their connecting shaft 56 are the same, and such axis of rotation lies co-axial with the axis of rotation of gear 51 and perpendicular to the axis of rotation of impeller shaft 56.

Figure 2:
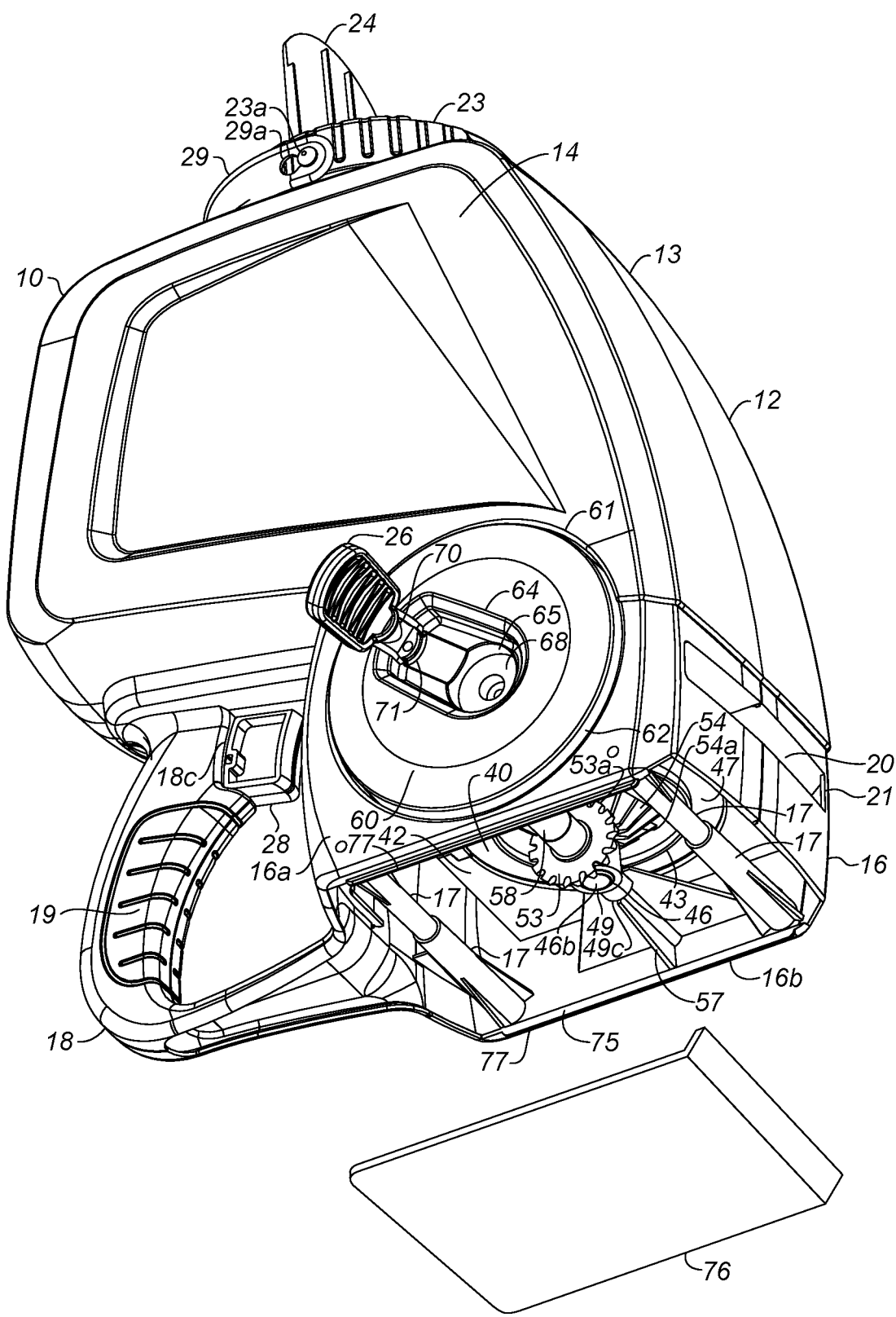
FIG. 2 is a perspective bottom view of the spreader of FIG. 1.
Figure 4:
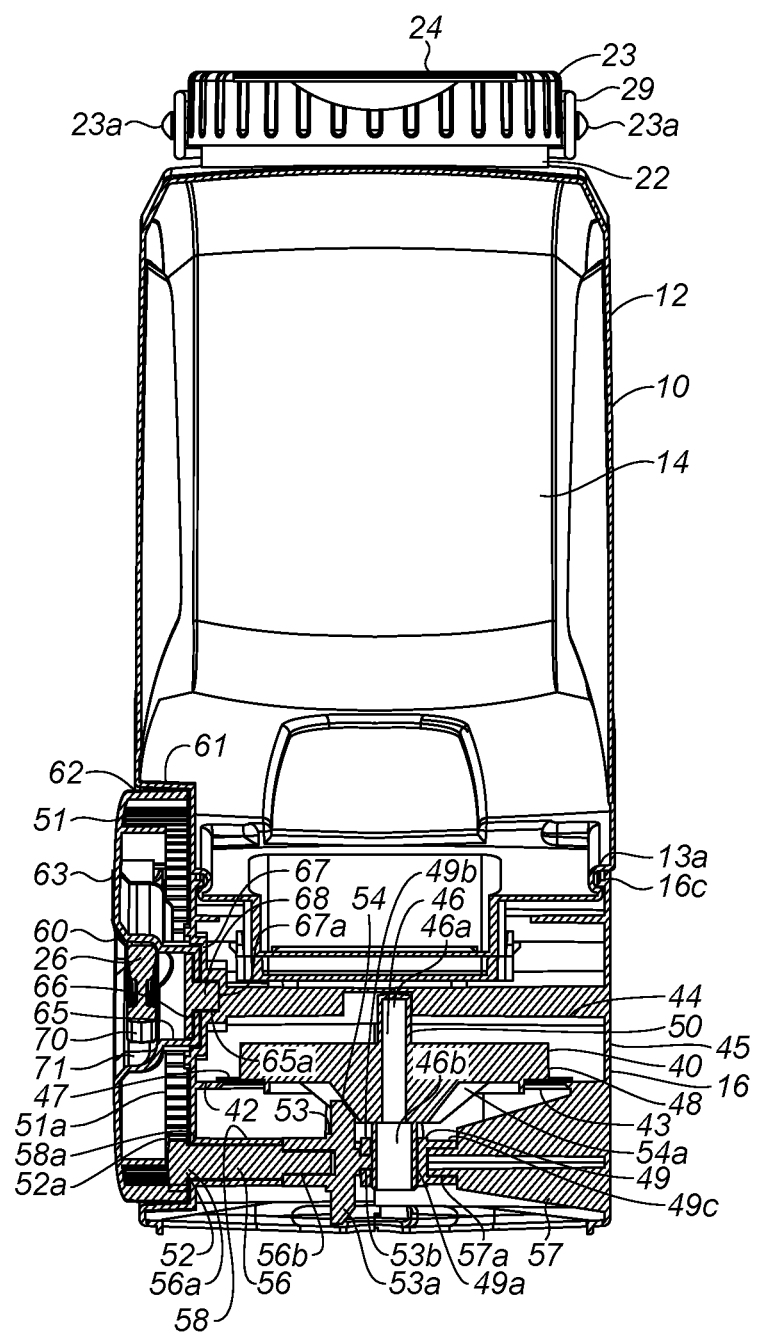
FIG. 4 is a cross-sectional view taken along line 4-4 of FIG. 1 in the direction of arrows at the ends of the line with the lid along the top cap closed.

In addition to bushing 49 supporting the bottom of shaft 46 of impeller 40 for rotation, bushing 49 further has an extension 49b with an opening or hole into which a central shaft 53b extending from gear 53 is mounted for rotation, as shown best in FIG. 4. Opposite extension 49b of bushing 49 is a cylindrical extension 49c of bushing 49 with an opening or hole into which is received an end 57a of a flange 57 that extends from the right side wall of lower housing portion 16. In this manner, bushing 49 supports gear 53 with respect to gear 54 for engagement of their respective teeth 53a and 54a. FIG. 2 also shows flange 57 extending in housing 12 and mounted to bushing 49, while allowing rotation of end 46a of the impeller's shaft 46 journaled in the cylindrical hole 49a of bushing 49.

As shaft 56 extends into cylindrical member 58 through opening 58a in circular recessed opening 61, teeth 52a (FIGS. 4, 5 and 7A) of pinion gear 52 mounted at the end 56a of shaft 56 engages teeth 51a along drive gear 51 provided by wheel 60. Wheel 60 is received along a recessed circular opening 61 (FIGS. 4 and 5) of housing 12. Wheel 60 has an outer wall 62, teeth 51a along the interior surface of wall 62, a front wall 63 with a cavity 64 for hand crank 26, and a hub 65 that extends from such front surface 63 to a cylindrical end 66 received in a further recessed circular opening 67 of housing 12 within recessed circular opening 61 of housing 12. To retain wheel 60 in circular opening 61 and enable rotation thereof, a bushing 68 extends through a central hole 65a in cylindrical end 66 of wheel hub 65 and a central hole 67a in circular opening 67. Other mechanisms may be used for mounting wheel 60 for rotation along one side of housing 12, so long as teeth 51a engage teeth 52a of pinion gear 52.

Hand crank 26 has a gripping portion that extends at one end to a knob 26a which extends, via an opening or hole of a tee member 70, into a curved guide slot 71 that engages to capture knob 26a at one end of cavity 64. Hand crank 26 may be stored recessed in cavity 64 (FIG. 4), and then pivoted by its knob 26a upwards along slot 71 to a position as shown in FIG. 1 to enable a user to turn the hand crank 26, thereby rotating wheel 60 rotationally coupled to impeller 40 by gearing of gears 51-54. Wheel 60 rotates with rotational torque manually applied to hand crank 26, while hand crank 26 can pivot 360 degrees within slot 71. In summary, impeller 40 is mechanically coupled to the rotation of wheel 60, since rotation of wheel 60 by manual turning of handle crank 26 (clockwise or counterclockwise direction as indicated by arrow 59a in FIG. 7A) is coupled by teeth 51a of gear 51 engaging teeth 52a of gear 52, which then rotates shaft 56 to rotate gear 53 and its teeth 53a (as indicated by arrow 59b in FIG. 7A) that engage teeth 54a of gear 54 mounted on the underside of platform 47 of impeller 40 that then rotates along its shaft 46 in bushing 49 and cylindrical hole 50 (as indicated by arrow 59c in FIG. 7A). Preferably, the upper portion of teeth 54a of gear 54 extends through aperture 43 to the bottom surface of platform 47 of impeller 40.

Figure 3A:
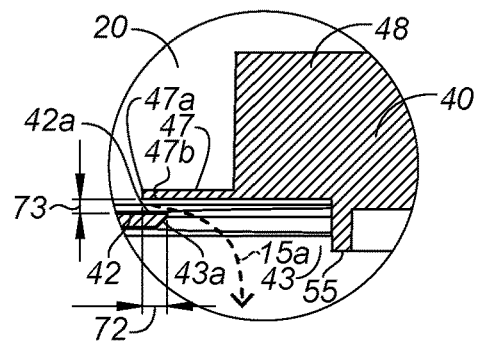
FIG. 3A is a more detailed view of FIG. 3 along circled area labelled G in FIG. 3 showing a marginal overlap of the platform of the impeller over the aperture at the bottom of the chamber to provide a gap sealing particulate material that could obstruct rotation of the impeller.

As best shown in FIG. 3A, platform 47 of impeller 40 has an outer circular periphery or circular edge 47a offset with respect to the outer circular edge 43a of aperture 43 so that outer circular periphery 47a marginally extends radially over the outer circular edge 43a of aperture 43 and along upper surface of bottom wall 42 of chamber 20 to a distance denoted as 72. This forms a gap 73 under platform 47 of impeller 40 between the bottom surface 47b of its outer periphery 47a and the upper surface 42a of bottom wall 42 of chamber 20. Such gap 73 extends 360 degrees along the outer circular edge 47a of the impeller 40. The radial distance 72 gap 73 extends is very small, for example 0.065 inches (approximately ⅟₁₆ inches) from aperture edge 43a. Thus, the outer circular periphery 47a of platform 47 is proximal to outer circular edge 43a of aperture 43 due to such small distance 72 outer circular edge 43a radially extends in chamber further outward than circular edge 43a of aperture 43. The outer diameters of aperture 43 and platform 47 of impeller 40 are preferably approximately the same given that the overhang of periphery 47a of platform 47 over chamber bottom wall 42 is very small.

Gap 73 is selected of a height that seals the gap from particulate material in chamber 20 sized larger than the gap from entering under impeller 40 and potentially hindering its rotation, and it has been found that particulate material at or smaller than gap 73 passes there through under impeller 40 downward through the aperture 43 and out chamber 20 along path 15a. For example, gap 73 may be 0.037 inches, but preferably at or less than 0.04 inches so long as impeller 40 freely rotates in the chamber along bottom wall 42. However, other dimensions for the overhang distance 72 and gap 73 may be used depending on the size (or range of sizes) of the particulate material that passes into chamber 20 and then rotated by impeller 40 along platform 47 and vanes 48 for projection out discharge opening 21. An optional circular barrier wall or ridge 55 (best shown in FIG. 7A) may extend downward from the underside of platform 47. Such circular wall 55 faces circular edge 43a (FIG. 3A) of aperture 43 along path 15b just after gap 73, and may assist in directing any small particulates along path 15b that encounter wall 55.

Particulate material that passes through the gap 73 and under the impeller 40, via the bottom aperture 43 of compartment 20, are so small in size (typically on the order of the size of specks of dust) due to the dimension of gap 73 that such passing particulates of the particulate material unlikely impacts rotation of teeth 54a and 53b of gears 54 and 53, respectively, mounted under the impeller 40, and thus such passing particulates harmlessly exits the spreader 10 via a bottom opening 75 of the housing 12 as indicated by arrows 15b in FIG. 3.

Optionally, housing 12 may have a removable cover 76 to close opening 75 that slides along rails 77 along housing 12 along opposite sides of opening 75. Cover 76 is shown in its removed state in FIG. 2. Such cover 76 when closed over opening 75 thus may define another compartment within housing 12 between underside of bottom wall 42 of chamber 20 and such cover. Optionally latch(es) may be provided along cover 76 to retain cover 76 in housing 12 to enable manual release of the cover from tab(s) along the housing with or without rails 77. Thus cover 76, if present, may be removed as needed after spreader operation to remove or clean any build-up of particulates along path 15b collected thereupon. Other mechanisms for retaining cover 76 to housing 12 with or without a manual release mechanism may also be used. Spreader 10 may be used with or without cover 76 as desired by a user.

The components described herein are preferably of injected molded plastic, such as polypropylene, where parts of drive mechanism, such as impeller 40, bushing 68, wheel 60, gears 51-53, hand crank 26, are of low friction material, such as polyoxymethylene.

From the foregoing description, it will be apparent that there has been provided an improved hand-held spreader apparatus. Variations and modifications in the herein described apparatus and method of use will undoubtedly suggest themselves to those skilled in the art. Accordingly, the foregoing description should be taken as illustrative and not in a limiting sense.

The invention claimed is:

1. A hand-held spreader comprising:
 a housing having a compartment for particulate material, a chamber below said compartment having a bottom wall with a circular aperture defining an outer edge, an impeller mounted for rotation in said chamber along said bottom wall, a discharge opening along one side of said chamber, and a path along which said particulate material passes into said chamber for discharge from said chamber away from said spreader via said discharge opening when said impeller is rotated; and
 said impeller comprising a circular platform having an upper surface and opposite bottom surface together defining an outer circular periphery and a plurality of vanes extending upwardly from said upper surface, wherein a length of each of said plurality of vanes is less than a radius of said outer circular periphery, wherein said circular periphery extends radially outwardly of and adjacent to said outer edge of said circular aperture to form an overhang wherein a length of said overhang is less than the difference between said length of said vanes and said radius of said platform, and wherein said bottom surface of said platform is spaced above said chamber bottom wall to form a gap between said platform and said bottom wall of said chamber, said gap preventing particulate material larger than said gap from entering under said impeller, with any of said particulate material smaller than said gap that enters said gap passing through said aperture and away from said impeller.

2. The spreader according to claim 1 wherein said particulate material exits said spreader via said discharge opening of the chamber and said bottom opening of the housing for distribution upon a surface.

3. The spreader according to claim 1 further comprising a hand crank rotationally coupled to said impeller via said aperture to enable rotation of said impeller.

4. The spreader according to claim 1 wherein said housing has a handle portion enabling a user to hand carry the spreader.

5. The spreader according to claim 4 further comprising a movable trigger along said handle portion, and a movable gate mechanically coupled to said trigger and extendible over an opening at a top of said chamber in said path of particulate material from said upper compartment into said chamber, in which said trigger is biased forward to normally close said gate over said opening at said top of said chamber to prevent particulate material from falling onto the impeller along said path, and backward motion of said gate by pulling back said trigger enables flow via said opening at said top of said chamber into said chamber.

6. The spreader according to claim 1 wherein said spreader is operated in a first mode by discharge of said particulate material via said discharge opening, and said housing further comprises an upper opening through which particulate material may be received for storage in said compartment, and a cap located over said upper opening to close said upper opening, in which said cap has a plurality of holes which enables said spreader to be operated in a second mode by manually shaking said particulate material out of compartment via said plurality of holes.

7. The spreader according to claim 6 further comprising a cover over said plurality of holes when said spreader is operated in said first mode.

8. The spreader according to claim 1 wherein said housing includes a cover over said bottom opening to define another compartment, in which said another compartment collects said particulate material that enters said gap and passes downward through said aperture, and said cover is removable to enable removal of collected said particulate material from said another compartment.

9. The spreader according to claim 1 further comprising a flow rate cap member having an opening in said path of said particulate material from said upper compartment into said chamber, in which said opening of said flow rate cap member is of a diameter to permit flow of particulate material up to a maximum flow rate along said path.

10. The spreader according to claim 9 wherein said flow rate cap member represents one of a plurality of flow rate cap members each with a different diameter opening selected for use in said spreader, and said flow rate cap member is replaceable with another one of said plurality of flow rate cap members.

11. The spreader according to claim 1 wherein said impeller has a shaft defining an axis of rotation of said impeller, said shaft having an upper end journaled for rotation in a hole along a top wall of said chamber, and a lower end under said chamber journaled for rotation in a retainer mounted in said housing.

12. The spreader according to claim 11 wherein said spreader comprises a plurality of gears, wherein one of said gears extends downward along the underside of said impeller which engages another of said gears which rotates responsive to a hand-crank.

13. The spreader according to claim 1 wherein said gap allows rotation of said platform along said bottom wall while being at or less than 0.04 inches along a dimension between said platform and said bottom wall of said chamber, and said platform radially overhangs approximately ⅛ inches along said bottom wall away from said circular aperture.

14. A hand-held spreader comprising:
a housing having an upper compartment for particulate material and a lower chamber having a bottom surface with an aperture;
a rotationally mounted impeller extending through said aperture onto which falls the particulate material from the upper compartment;
a discharge opening along a side of the chamber through which the particulate material which falls upon the impeller are discharged outward from the spreader;
a hand crank rotationally coupled to the impeller to enable rotation thereof;
said impeller comprising a circular platform having an outer edge offset with respect to an outer edge of said aperture so that an outer periphery of said platform extends radially outwardly over and adjacent to said outer edge of said aperture along said bottom surface of the chamber to form an overhang, and a plurality of vanes extending upwardly from an upper surface of said impeller, wherein a length of each of said plurality of vanes is less than a radius of said outer periphery and wherein a length of said overhang is less than the difference between a length of said vanes and a radius of said circular platform; and
a gap between said bottom surface of the platform along said outer periphery and said bottom surface of the chamber, said gap being selected of a height that seals said gap from said particulate material larger than said gap from entering under the impeller, and particulate material that enters the gap passes there through under the impeller via the aperture of the chamber,
wherein said housing has a bottom opening below said chamber and said aperture through which the particulate material that enters said gap and passes downward through said aperture exits said spreader while said spreader is in use.

\* \* \* \* \*